US010574299B2

(12) United States Patent
Lim et al.

(10) Patent No.: US 10,574,299 B2
(45) Date of Patent: Feb. 25, 2020

(54) INTERNAL ANTENNA OF DISPLAY

(71) Applicant: Samsung Electronics Co., Ltd., Suwon-si, Gyeonggi-do (KR)

(72) Inventors: Sang-Ho Lim, Suwon-si (KR); Seung-Tae Ko, Bucheon-si (KR); Yoon-Geon Kim, Seoul (KR); Won-Bin Hong, Seoul (KR)

(73) Assignee: Samsung Electronic Co., Ltd., Suwon-si (KR)

( * ) Notice: Subject to any disclaimer, the term of this patent is extended or adjusted under 35 U.S.C. 154(b) by 0 days.

(21) Appl. No.: 16/213,007

(22) Filed: Dec. 7, 2018

(65) Prior Publication Data
US 2019/0109618 A1 Apr. 11, 2019

Related U.S. Application Data

(63) Continuation of application No. 15/223,818, filed on Jul. 29, 2016, now Pat. No. 10,153,808.

(30) Foreign Application Priority Data

Jul. 29, 2015 (KR) .................. 10-2015-0107128

(51) Int. Cl.
H01Q 7/00 (2006.01)
H04B 5/00 (2006.01)

(52) U.S. Cl.
CPC .......... H04B 5/0031 (2013.01); H04B 5/0081 (2013.01)

(58) Field of Classification Search
CPC .......... H01Q 7/00; H01Q 1/2208; H01Q 1/36; H01Q 1/46; H04B 5/0031; H04B 5/0081
See application file for complete search history.

(56) References Cited

U.S. PATENT DOCUMENTS 2,469,168 A * 5/1949 Loughlin ............... H03H 2/008
343/748
5,246,790 A * 9/1993 Mooney ............... H01M 2/1055
429/7
7,324,061 B1 * 1/2008 Hadley ............ G06K 19/07749
343/873
(Continued)

FOREIGN PATENT DOCUMENTS

EP 0375415 A2 6/1990
EP 1466384 A1 10/2004
(Continued)

OTHER PUBLICATIONS

European Search Report dated Nov. 2, 2018, issued in European Patent Application No. 16830884.9.

Primary Examiner — Tho G Phan
(74) Attorney, Agent, or Firm — Jefferson IP Law, LLP

(57) ABSTRACT

A power supply device for an internal antenna of a display is provided. The power supply device includes at least two coils configured to be separated by a predetermined interval and a power supply terminal of the at least two coils to connect the at least two coils in parallel. An integrated circuit (IC) includes the power supply terminal of the at least two coils connects the at least two coils in parallel and supplies a current to the at least two coils through the included power supply terminal. Phases of the current flowing in the at least two coils are the same due to the current supplied by the IC.

15 Claims, 11 Drawing Sheets

(56) References Cited

U.S. PATENT DOCUMENTS

| | | | |
|---|---|---|---|
| 7,377,447 B2* | 5/2008 | Oberle | G06K 19/07749 |
| | | | 235/451 |
| 7,453,406 B2 | 11/2008 | Chenoweth | |
| 8,070,070 B2* | 12/2011 | Taniguchi | G06K 19/0723 |
| | | | 235/492 |
| 9,634,380 B2* | 4/2017 | Kato | H01Q 1/243 |
| 10,153,808 B2* | 12/2018 | Lim | H04B 5/0081 |
| 2005/0083236 A1 | 4/2005 | Louzir et al. | |
| 2010/0026582 A1 | 2/2010 | Choi et al. | |
| 2010/0245177 A1 | 9/2010 | Jagielski et al. | |
| 2013/0196596 A1 | 8/2013 | Parekh et al. | |
| 2014/0176384 A1 | 6/2014 | Yosui et al. | |
| 2014/0179224 A1 | 6/2014 | Liao | |
| 2014/0218262 A1 | 8/2014 | Tsubaki | |
| 2015/0048985 A1 | 2/2015 | Park et al. | |

FOREIGN PATENT DOCUMENTS

| | | |
|---|---|---|
| EP | 2 573 871 A1 | 3/2013 |
| EP | 2 223 379 B1 | 10/2017 |
| JP | H02184101 A | 7/1990 |
| JP | 2011-066628 A | 3/2011 |
| WO | 2008-152180 A1 | 12/2008 |
| WO | 2009/071124 A1 | 6/2009 |

\* cited by examiner

INTERNAL ANTENNA OF DISPLAY

CROSS-REFERENCE TO RELATED APPLICATION(S)

This application is a continuation of prior application Ser. No. 15/223,818, filed on Jul. 29, 2016, and was based on and claimed priority under 35 U.S.C. § 119(a) of a Korean patent application filed on Jul. 29, 2015 in the Korean Intellectual Property Office and assigned Serial number 10-2015-0107128, the entire disclosure of which is hereby incorporated by reference.

TECHNICAL FIELD

The present disclosure relates to an internal antenna of a display including a power supply device.

BACKGROUND

In order to meet wireless data traffic demands that have increased after $4^{th}$ generation (4G) communication system commercialization, efforts to develop an improved 5G communication system or a pre-$5^{th}$ generation (5G) communication system have been made. For this reason, the 5G communication system or the pre-5G communication system is called a beyond 4G network communication system or a post long term evolution (LTE) system.

In order to achieve a high data transmission rate, an implementation of the 5G communication system in a mmWave band (for example, 60 GHz band) is being considered. In the 5G communication system, technologies such as beamforming, massive multi-input multi-output (MIMO), full dimensional MIMO (FD-MIMO), array antenna, analog beam-forming, and large scale antenna are discussed to mitigate propagation path loss in the mmWave band and increase propagation transmission distance.

Further, technologies such as an evolved small cell, an advanced small cell, a cloud radio access network (cloud RAN), an ultra-dense network, device to device communication (D2D), a wireless backhaul, a moving network, cooperative communication, coordinated multi-points (CoMP), and interference cancellation to improve the system network have been developed for the 5G communication system.

In addition, the 5G system has developed advanced coding modulation (ACM) schemes such as hybrid frequency shift keying (FSK) and quadrature amplitude modulation (QAM) modulation (FQAM) and sliding window superposition coding (SWSC), and advanced access technologies such as filter bank multi carrier (FBMC), non orthogonal multiple access (NOMA), and sparse code multiple access (SCMA).

In general, a wireless communication terminal that supports the 5G communication has a display. The display may have an internal antenna of a display based on a transparent electrode. For example, the internal antenna of the display may have a characteristic of a relatively thin thickness compared to that of a general coil line or printed circuit board (PCB) metal layer. Accordingly, when current is applied, an ohmic loss due to heat may be relatively high. Also, there may be a limitation in continuously increasing the thickness of the transparent electrode based on a semiconductor process.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of maximizing a Q value in implementing coils included in an internal antenna of a display. For example, when an excessive increase in a resistance value can be suppressed, about two times of a Q value can be implemented.

Another aspect of the present disclosure is to provide an apparatus for supplying a current of the same phase to coils having a multi-layer structure for parallel power supply.

In accordance with an aspect of the present disclosure, an internal antenna of a display is provided. The internal antenna of the display includes at least two coils configured to be separated by a predetermined interval, and an integrated circuit (IC) including a power supply terminal of the at least two coils to connect the at least two coils in parallel, the IC supplying a current through the included power supply device. Phases of the current flowing in the at least two coils are identical due to the current supplied by the IC.

In accordance with another aspect of the present disclosure, an internal antenna of a display is provided. The internal antenna of the display includes a torus shaped first antenna, a circular shaped second antenna disposed on a same plane on which the first antenna is disposed and disposed substantially coaxially inside a center space of the first antenna, an integrated circuit (IC) that supplies driving currents of the first antenna and the second antenna, and a first conductor that connects the IC with the first and second antennas to supply in parallel the driving currents supplied by the IC to a power supply terminal included in the first antenna and a power supply terminal included in the second antenna.

According to various embodiments, it is possible to reduce a resistance value in a power supply device for an internal antenna of a display and increase a recognition distance, thereby reducing power consumption.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
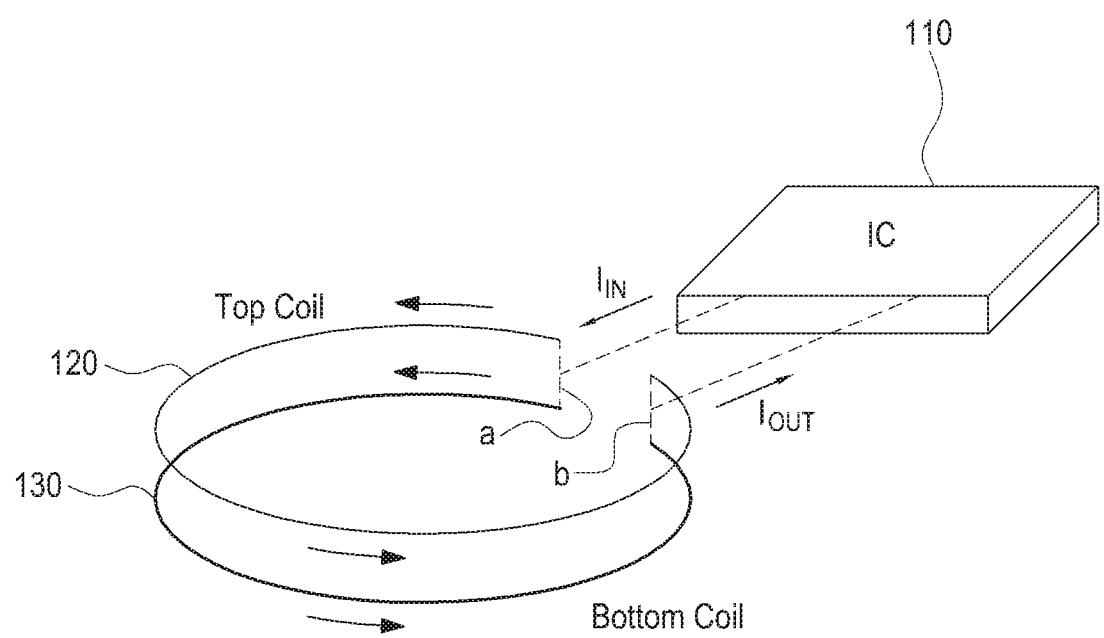
FIG. 1 illustrates a structure of a power supply device for an internal antenna included in a display according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, the words "have," "may have," "include," "may include," and the like indicate existence of the corresponding feature (e.g., a numerical value, a function, an operation, or an element such as a component, etc.) and does not exclude the existence of the additional feature.

Throughout the specification, the expressions "A or B," "at least one of A or/and B," "one or more of A or/and B," and the like may include all combinations of the listed items. For example, "A or B," "at least one of A and B," or "at least one of A or B" may refer to all cases of (1) including at least one A, (2) including at least one B, or (3) including both at least one A and at least one B.

The expression "a first", "a second", "the first", or "the second" used in various embodiments of the present disclosure may modify various components regardless of the order and/or the importance but does not limit the corresponding components. The above-described expressions may be used to distinguish an element from another element. For example, a first user device and a second user device indicate different user devices although both of them are user devices. For example, a first element may be termed a second element, and similarly, a second element may be termed a first element without departing from the scope of the present disclosure.

When it is mentioned that one element (e.g., a first element) is "(operatively or communicatively) coupled with/to or connected to" another element (e.g., a second element), it should be construed that the one element is directly connected to the another element or the one element is indirectly connected to the another element via yet another element (e.g., a third element). In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

Unless defined otherwise, all terms used herein, including technical terms and scientific terms, may have the same meaning as commonly understood by a person of ordinary skill in the art to which the present disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, even the term defined in the present disclosure should not be interpreted to exclude embodiments of the present disclosure.

Various embodiments proposed below will be described in detail with reference to the accompanying drawings.

FIG. 1 illustrates a structure of a power supply device for an internal antenna included in a display according to various embodiments of the present disclosure.

Referring to FIG. 1, an integrated circuit (IC) 110 supplies the current to a plurality of coils 120 and 130 having a multi-layer structure included in the display. The plurality of coils 120 and 130 may be provided to perform different functions. For example, the plurality of coils 120 and 130 may include a coil for near field communication (NFC) and a coil for magnetic secure transmission (MST). In this case, the coil for NFC may operate as an antenna that supports NFC, and the coil for MST may operate as an antenna that supports MST.

For example, the IC 110 may supply the current to the plurality of coils 120 and 130 having the multi-layer structure through two power supply terminals 'a' and 'b'. That is, the current supplied by the IC 110 is supplied to the plurality of coils 120 and 130 that are connected in parallel due to the multi-layer structure through the power supply terminal 'a'. Accordingly, the current of the same phase may be supplied to the plurality of coils 120 and 130. The current supplied to the power supply terminal 'a' flows through each of the plurality of coils 120 and 130 and then is output through the power supply terminal 'b'.

According to an embodiment, the two coils (top coil 120 and bottom coil 130) having the multi-layer structure may be separated by a predetermined interval in an up/down direction and connected by the same input power supply terminal 'a' and the same output power supply terminal 'b' in order to have a parallel structure. Accordingly, the current may be supplied to the two coils (top coil 120 and bottom coil 130) through a parallel power supply method.

The current ($I_{IN}$) applied to the input power supply terminal 'a' may be defined by Equation 1 according to Kirchoff's law.

$$I_{IN} = I_{top} + I_{bottom} \qquad \text{Equation 1}$$

In Equation 1, $I_{top}$ denotes an amount of current flowing through the top coil, and $I_{bottom}$ denotes an amount of current flowing through the bottom coil.

Input resistance ($R_{IN}$) viewed at the input power supply terminal 'a' and the output power supply terminal 'b' from the coils side may be defined by Equation 2 below.

$$R_{IN} = R_{top\ Coil} \| R_{bottom\ Coil} \qquad \text{Equation 2}$$

Based on Equation 2, the input resistance ($R_{IN}$) corresponds to a result value according to a parallel connection of a resistance value ($R_{top\ Coil}$) of the top coil and a resistance value ($R_{bottom\ Coil}$) of the bottom coil.

Accordingly, when coils included in a power supply device for an internal antenna included in the display are configured to have a multi-layer structure of a parallel connection, it may be noted that the resistance value can be reduced. This makes an optimum Q value extracted from the power supply device for the internal antenna included in the display. It may be identified from Equation 3 below.

$$Q = \frac{\omega L}{R} \qquad \text{Equation 3}$$

Based on Equation 3, it may be noted that the Q value is inversely proportional to a resistance value (R) and is proportional to an inductance (L) value. That is, in order to obtain a small Q value, the resistance value should be reduced and the inductance value should be increased. Accordingly, the coils 120 and 130 having the parallel structure illustrated in FIG. 1 become the reason to reduce the resistance value.

Figure 2:
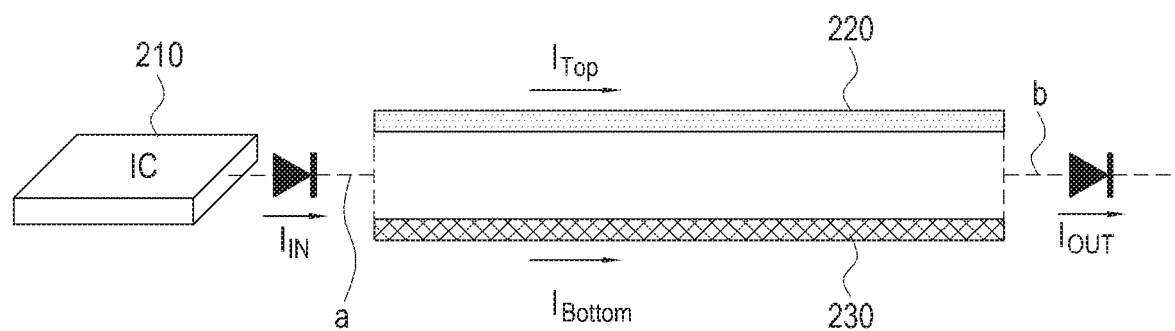
FIG. 2 illustrates a side structure of a power supply device for an internal antenna included in a display according to various embodiments of the present disclosure.

FIG. 2 illustrates a side structure of a power supply device for an internal antenna included in a display according to various embodiments of the present disclosure.

Referring to FIG. 2, a top coil 220 and a bottom coil 230 have a multi-layer structure. Further, the top coil 220 and the bottom coil 230 have a parallel structure for using a common input power supply terminal 'a' into which the current $I_{IN}$ supplied from an IC 210 is input and using a common output power supply terminal 'b' from which the current $I_{OUT}$ is output to the IC 210.

Due to the current $I_{IN}$ input into the input power supply terminal 'a', the current $I_{top}$ flows to the top coil 220 and the current $I_{bottom}$ flows to the bottom coil 230. A diode located before the input power supply terminal 'a' and a diode located after the output power supply terminal 'b' may be selectively applied as necessary.

Figure 3:
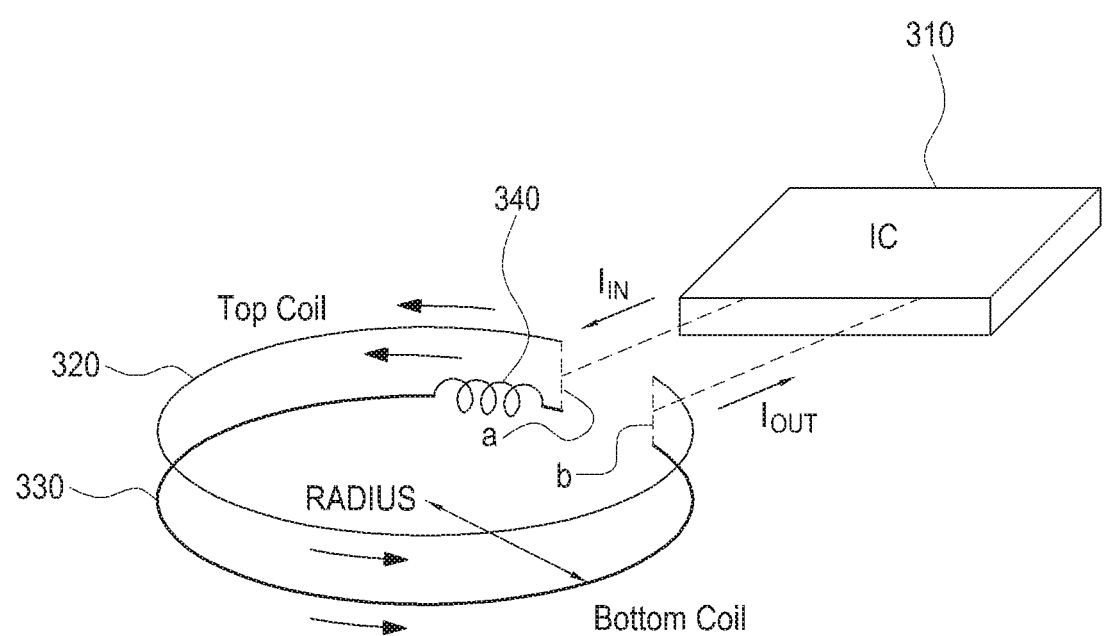
FIG. 3 illustrates another example of a structure of a power supply device for an internal antenna included in a display according to various embodiments of the present disclosure.

FIG. 3 illustrates another example of a structure of a power supply device for an internal antenna included in a display according to various embodiments of the present disclosure.

Referring to FIG. 3, an IC 310 supplies the current to a plurality of coils 320 and 330 having a multi-layer structure, which is built-in in the display. For example, the IC 310 may supply the current to the plurality of coils 320 and 330 having the multi-layer structure through two power supply terminals 'a' and 'b'. That is, the current supplied by the IC 310 is supplied to the plurality of coils 320 and 330 that are connected in parallel through the power supply terminal 'a'. Accordingly, the current of the same phase may be supplied to the plurality of coils 320 and 330. The current supplied to the power supply terminal 'a' flows through each of the plurality of coils 320 and 330 and then is output through the power supply terminal 'b'.

In addition, in order to extract an optimum Q value from the power supply device for the internal antenna included in the display, an inductance value of the bottom coil 330 may be increased. An inductor 340 added to the bottom coil 330 may be added to reduce the Q value.

For example, if the added inductor 340 is not considered, the inductance value ($L_{bottom\ wire}$) of the bottom coil 330 may be defined by Equation 4 below.

$$L_{bottom\ wire} = \mu_0 \mu r (ln(8R/a) - 2) \qquad \text{Equation 4}$$

In Equation 4 above, R denotes a radius of the bottom coil, a denotes a thickness (mm) of the wire, and to corresponds to 1.427 nH.

However, if an inductance value (Lumped L) due to the added inductor 340 is considered, a total inductance value ($L_{bottom}$) may be defined by Equation 5 below.

$$L_{bottom} = \text{Lumped } L + L_{bottom\ wire} \qquad \text{Equation 5}$$

Based on Equation 5 above, it may be noted that the inductance value ($L_{bottom\ wire}$) of the pure bottom coil 330 is added to an inductance value (Lumped L) due to the inductor 340. This may be the reason to increase the corresponding Q value in consideration of characteristics in that the Q value is proportional to the inductance value.

However, the inductor 340 for increasing the Q value may be installed in the top coil 320 instead of the bottom coil 330. Further, the inductor 340 does not have to be installed in a particular location of the bottom coil 330 or the top coil 320. That is, a similar purpose can be obtained even though the inductor 340 is installed in any location on the bottom coil 330 or the top coil 320.

According to an embodiment, inductance of the added inductor 340 may be determined in consideration of inductance ($L_{top}$) of the top coil 320 and inductance ($L_{bottom}$) of the bottom coil 330. For example, when the inductor 340 is added to the bottom coil 330, inductance ($L_{bottom}$) of the bottom coil 330 to which the inductor is added and inductance ($L_{top}$) of the top coil 320 may be the same. For this reason, the inductor 340 may be added to a coil having smaller inductance between the top coil 320 and the bottom coil 330.

Figure 4:
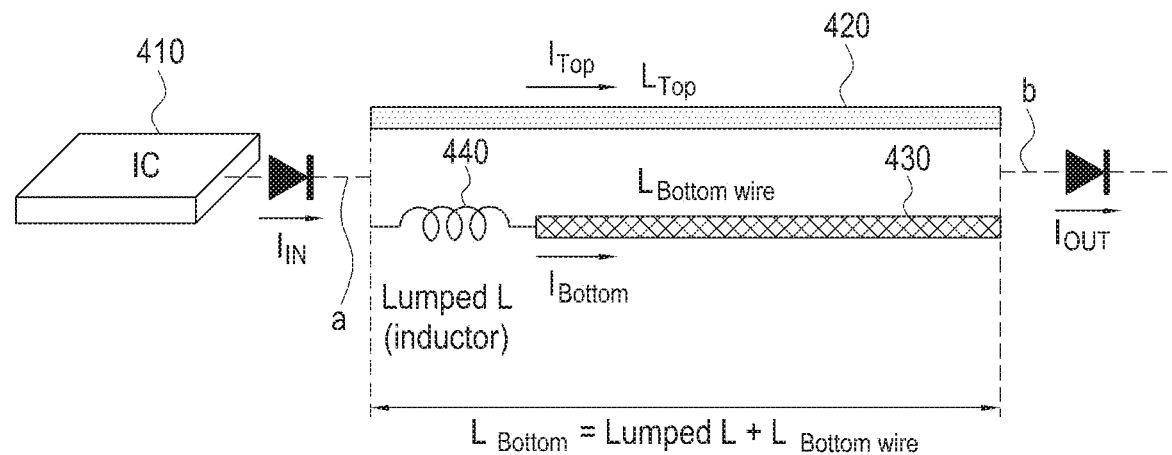
FIG. 4 illustrates another example of a side structure of a power supply device for an internal antenna included in a display according to various embodiments of the present disclosure.

FIG. 4 illustrates another example of a side structure of a power supply device for an internal antenna included in a display according to various embodiments of the present disclosure.

Referring to FIG. 4, a top coil 420 and a bottom coil 430 have a multi-layer structure. Further, the top coil 420 and the bottom coil 430 have a parallel structure for using a common input power supply terminal 'a' into which the current $I_{IN}$ supplied from an IC 410 is input and using a common output power supply terminal 'b' from which the current $I_{OUT}$ is output to the IC 410.

Due to the current $I_{IN}$ input into the input power supply terminal 'a', the current $I_{top}$ flows to the top coil 420 and the current $I_{bottom}$ flows to the bottom coil 430. A diode located before the input power supply terminal 'a' and a diode located after the output power supply terminal 'b' may be selectively applied as necessary.

An inductor 440 may be added between the input power supply terminal 'a' and the bottom coil 430. The added inductor 440 has a predetermined inductance value (Lumped L). Accordingly, a total inductance value ($L_{bottom}$) of the bottom line may be determined by a value generated by adding the inductance value (Lumped L) of the inductor 440 to the inductance value ($L_{bottom\ wire}$) of the bottom coil 330.

Figure 5:
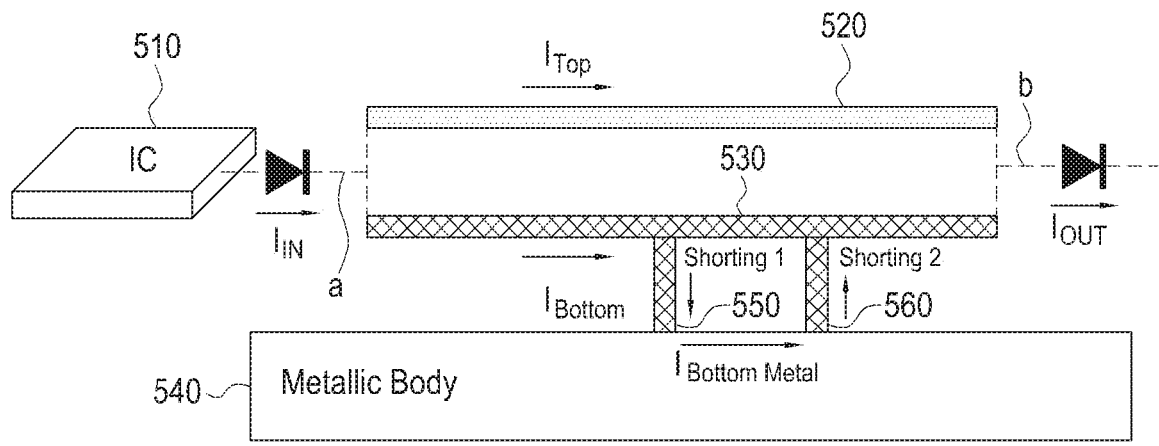
FIG. 5 illustrates another example of a side structure of a power supply device for an internal antenna included in a display according to various embodiments of the present disclosure.

FIG. 5 illustrates another example of a side structure of a power supply device for an internal antenna included in a display according to various embodiments of the present disclosure.

Referring to FIG. 5, a top coil 520 and a bottom coil 530 have a multi-layer structure. Further, the top coil 520 and the bottom coil 530 have a parallel structure for using a common input power supply terminal 'a' into which the current $I_{IN}$ supplied from an IC 510 is input and using a common output power supply terminal 'b' from which the current $I_{OUT}$ is output to the IC 510.

Due to the current $I_{IN}$ input into the input power supply terminal 'a', the current $I_{top}$ flows to the top coil 520 and the current $I_{bottom}$ flows to the bottom coil 530. A diode located before the input power supply terminal 'a' and a diode located after the output power supply terminal 'b' may be selectively applied as necessary.

The bottom coil 530 may short-circuit with a metallic body 540 in at least two points 550 and 560. In this case, the current flowing in the bottom coil 530 branches off through the point 550 and the current $I_{bottom\ metal}$ may flow in the metallic body 540 and return through the point 560.

When the bottom coil 530 and the metallic body 540 short-circuit, the input resistance value ($R_{IN}$) may be reduced. The reason is because the bottom coil 530 and the metallic body 540 have a parallel connection structure due to the short-circuit. This may be more clearly defined by Equation 6.

$$R_{IN} = R_{top\ Coil} \| (R_{bottom\ Coil} \| R_{Metallic\ Body}) \qquad \text{Equation 6}$$

In Equation 6, between $R_{Metallic\ Body}$ and $R_{bottom\ Coil}$, a relation in which $R_{Metallic\ Body}$ has a relatively larger value than $R_{bottom\ Coil}$ may be established. Accordingly, $R_{IN}$ may be further reduced compared to a case where there is no metallic body 540. The reduction in the resistance value may act as a cause that increases the Q value.

However, the metallic body 540 does not have to short-circuit with the bottom coil 530. That is, the same effect can be obtained even though the metallic body 540 short-circuits with the top coil 520. Further, the metallic body 540 does not need to short-circuit only at two points with the bottom coil 530 or the top coil 520. That is, the same effect can be obtained even though the metallic body 540 short-circuits at two or more points with the bottom coil 530 or the top coil 520.

Figure 6:
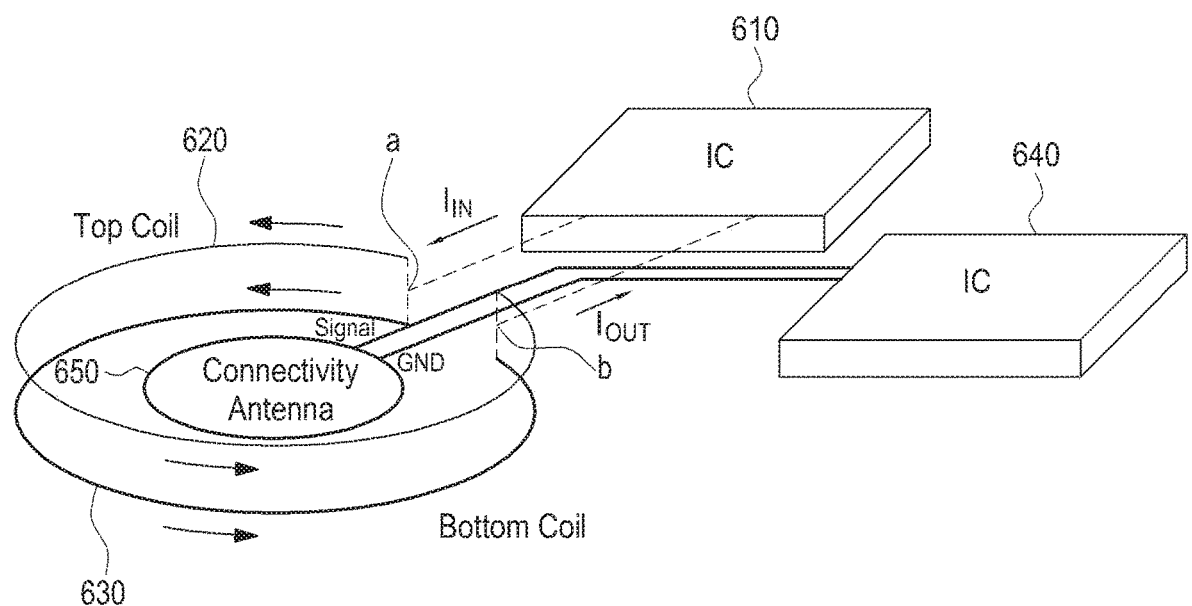
FIG. 6 illustrates another example of a structure of a power supply device for an internal antenna included in a display according to various embodiments of the present disclosure.

FIG. 6 illustrates another example of a structure of a power supply device for an internal antenna included in a display according to various embodiments of the present disclosure.

Referring to FIG. 6, an IC 610 supplies the current to a plurality of coils 620 and 630 having a multi-layer structure, which is built-in in the display. For example, the IC 610 may supply the current to the plurality of coils 620 and 630 having the multi-layer structure through two power supply terminals 'a' and 'b'. That is, the current supplied by the IC 610 is supplied to the plurality of coils 620 and 630 that are connected in parallel through the power supply terminal 'a'. Accordingly, the current of the same phase may be supplied to the plurality of coils 620 and 630. The current supplied to the power supply terminal 'a' flows through each of the plurality of coils 620 and 630 and then is output through the power supply terminal 'b'.

Meanwhile, for integration of elements, a connectivity antenna 650 may be placed in a space at the center of the plurality of coils 620 and 630. In this case, lines (signal line and ground line) for connecting the IC 640 that manages the connectivity antenna 650 may be placed in an open space (aperture) existing between the input power supply terminal 'a' and the output power supply terminal 'b'. This causes an effect of reducing a space loss due to the lines for connecting the IC 640 and the connectivity antenna 650.

Figure 7:
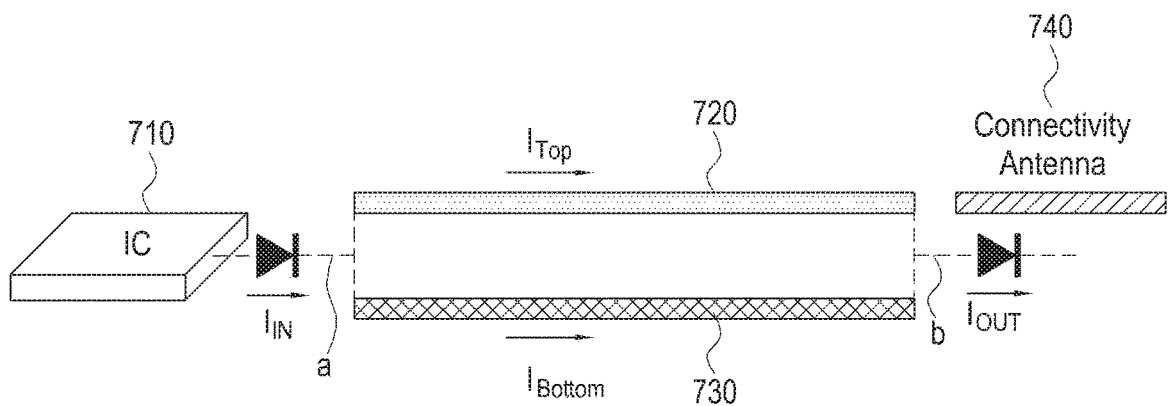
FIG. 7 illustrates another example of a side structure of a power supply device for an internal antenna included in a display according to various embodiments of the present disclosure.

FIG. 7 illustrates another example of a side structure of a power supply device for an internal antenna included in a display according to various embodiments of the present disclosure.

Referring to FIG. 7, a top coil 720 and a bottom coil 730 have a multi-layer structure. Further, the top coil 720 and the bottom coil 730 have a parallel structure for using a common input power supply terminal 'a' into which the current $I_{IN}$ supplied from an IC 710 is input and using a common output power supply terminal 'b' from which the current $I_{OUT}$ is output to the IC 710.

Due to the current $I_{IN}$ input into the input power supply terminal 'a', the current $I_{top}$ flows to the top coil 720 and the current $I_{bottom}$ flows to the bottom coil 730. A diode located before the input power supply terminal 'a' and a diode located after the output power supply terminal 'b' may be selectively applied as necessary. In addition, it may be noted that a connectivity antenna 740 is separately configured.

Figure 8:
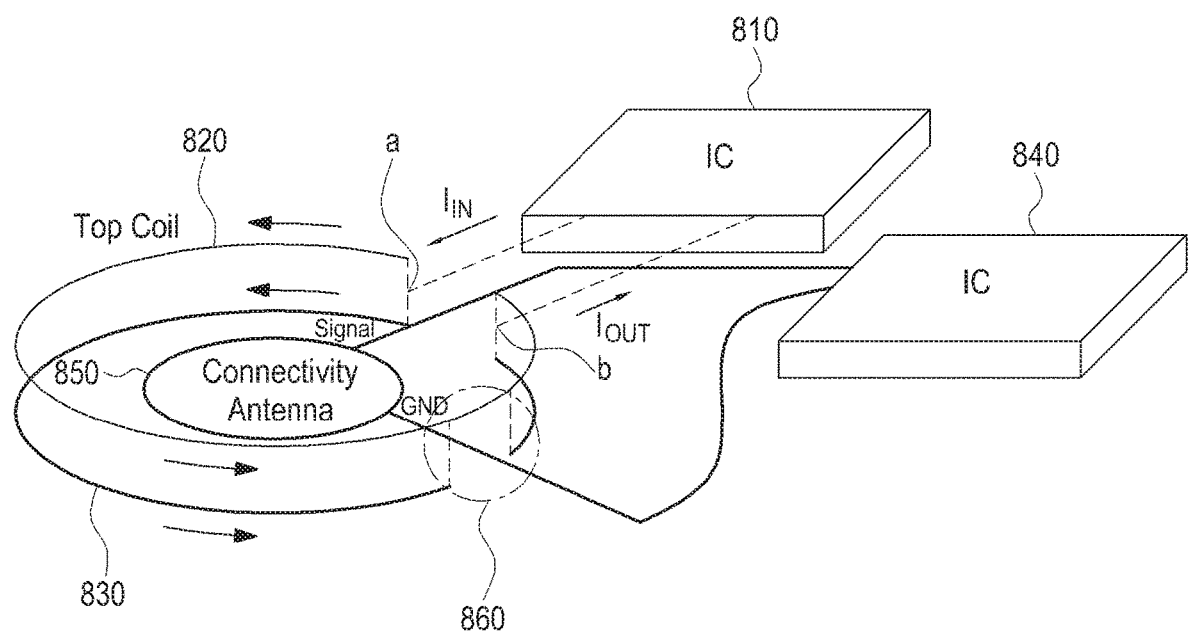
FIG. 8 illustrates another example of a structure of a power supply device for an internal antenna included in a display according to various embodiments of the present disclosure.

FIG. 8 illustrates another example of a structure of a power supply device for an internal antenna included in a display according to various embodiments of the present disclosure.

Referring to FIG. 8, an IC 810 supplies the current to a plurality of coils 820 and 830 having a multi-layer structure, which is built-in in the display. For example, the IC 810 may supply the current to the plurality of coils 820 and 830 having the multi-layer structure through two power supply terminals 'a' and 'b'. That is, the current supplied by the IC 810 is supplied to the plurality of coils 820 and 830 that are connected in parallel through the power supply terminal 'a'. Accordingly, the current of the same phase may be supplied to the plurality of coils 820 and 830. The current supplied to the power supply terminal 'a' flows through each of the plurality of coils 820 and 830 and then is output through the power supply terminal 'b'.

For integration of elements, the connectivity antenna 850 may be placed in a space at the center of the plurality of coils 820 and 830. In this case, in order to secure a space to draw lines (signal line and ground line) for connecting the IC 840 that manages the connectivity antenna 850, the plurality of coils 820 and 830 may be configured in a multi-step parallel structure. That is, a segment point 860 is installed to connect the plurality of coils 820 and 830 in a space other than the power supply terminals 'a' and 'b'. Accordingly, between the plurality of coils 820 and 830, there are two segment points and a total of four short-circuit points.

In this case, among the lines that connect the IC 840 for managing the connectivity antenna 850, the signal line may be inserted or drawn through the segment point by the power supply terminals and the ground line may be inserted or drawn through another segment point. This causes an effect of reducing a space loss due to the lines that connect the IC 840 and the connectivity antenna 850.

Figure 9A:
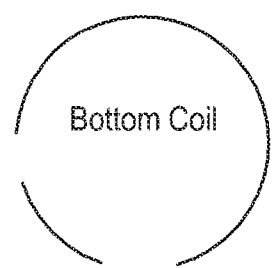
FIGS. 9A, 9B, and 9C illustrate examples of side structures of a power supply device for an internal antenna included in a display according to various embodiments of the present disclosure.
Figure 9B:
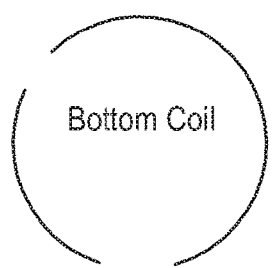
Figure 9C:
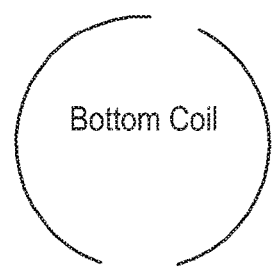

FIGS. 9A, 9B, and 9C illustrate examples of a side structure of a power supply device for an internal antenna included in a display according to various embodiments of the present disclosure. That is, FIGS. 9A to 9C illustrate examples in which the two segment points proposed in FIG. 8 are arranged on the bottom coil. However, the two segment points are not needed to exist for the bottom coil. That is, it may be apparent that the segment point is installed on the top coil. Further, there is no necessity to fix an interval between the short-circuit points included in the segment point by a particular value. However, in order to reduce the resistance value, it is necessary to set the interval between the short-circuit points as an optimum value.

Figure 10:
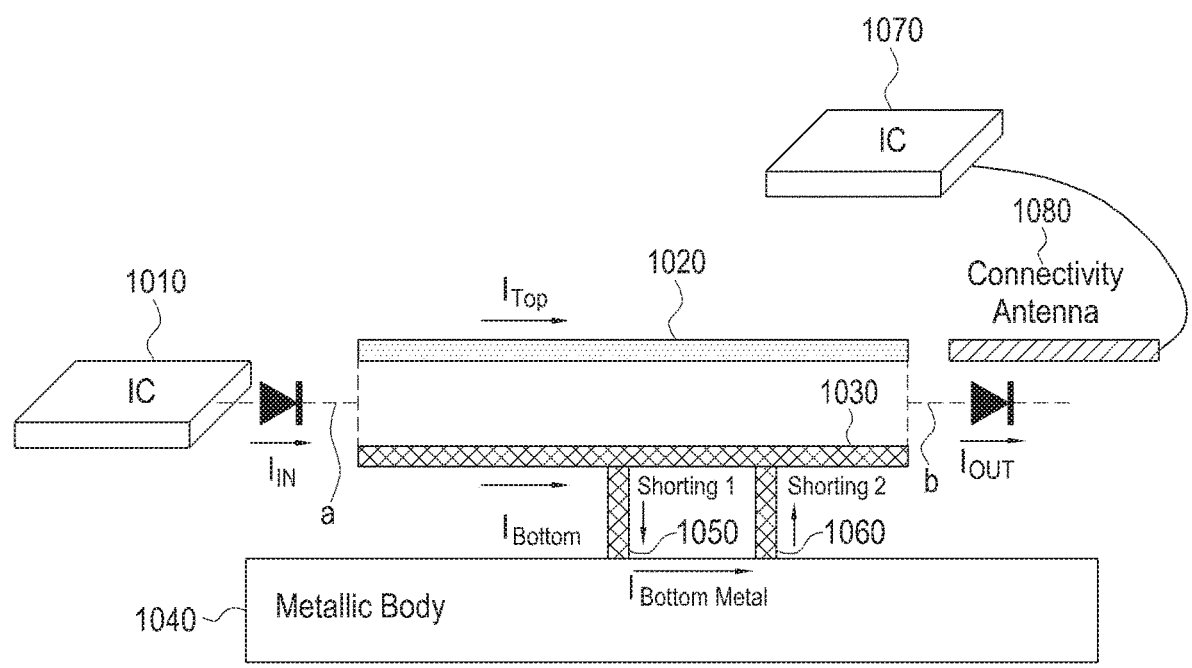
FIG. 10 illustrates another example of a side structure of a power supply device for an internal antenna included in a display according to various embodiments of the present disclosure.

FIG. 10 illustrates another example of a side structure of a power supply device for an internal antenna included in a display according to various embodiments of the present disclosure.

Referring to FIG. 10, a top coil 1020 and a bottom coil 1030 have a multi-layer structure. Further, the top coil 1020 and the bottom coil 1030 have a parallel structure for using a common input power supply terminal 'a' into which the current $I_{IN}$ supplied from an IC 1010 is input and using a common output power supply terminal 'b' from which the current $I_{OUT}$ is output to the IC 1010.

Due to the current $I_{IN}$ input into the input power supply terminal 'a', the current $I_{top}$ flows to the top coil 1020 and the current $I_{bottom}$ flows to the bottom coil 1030. A diode located before the input power supply terminal 'a' and a diode located after the output power supply terminal 'b' may be selectively applied as necessary.

The bottom coil 1030 may short-circuit with a metallic body 1040 in at least two points 1050 and 1060. In this case, the current flowing in the bottom coil 1030 branches off at point 1050 and the current $I_{bottom\_metal}$ may flow in the metallic body 1040 and return at point 1060.

When the bottom coil 1030 and the metallic body 1040 short-circuit, the input resistance value ($R_{IN}$) may be reduced. The reason is because the bottom coil 1030 and the metallic body 1040 have a parallel connection structure due to the short-circuit.

A connectivity antenna 1080 may be placed in a space at the center of the plurality of coils 1020 and 1030 for integration of elements. In this case, lines (signal line and ground line) for connecting an IC 1070 that manages the connectivity antenna 1080 may be placed in an open space (aperture) existing between the input power supply terminal 'a' and the output power supply terminal 'b' or corresponding to a separately configured segment point. This causes an effect of reducing a space loss due to the lines for connecting the IC 1070 and the connectivity antenna 1080.

Figure 11:
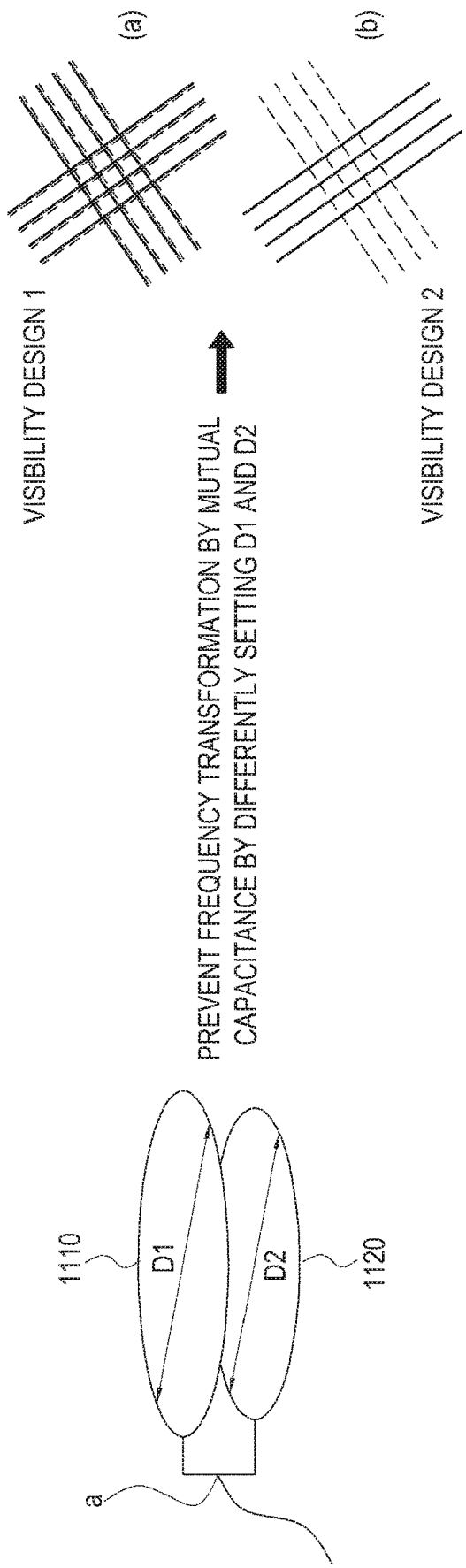
FIG. 11 illustrates an example of designing coils in consideration of visibility of a power supply device for an internal antenna included in a display according to various embodiments of the present disclosure.

FIG. 11 illustrates an example for designing coils in consideration of visibility of a power supply device for an internal antenna included in a display according to various embodiments of the present disclosure.

Referring to FIG. 11, it is possible to improve visibility by differently designing radiuses D1 and D2 of a connectivity antenna 1110 and coils 1120 according to a parallel power supply scheme, which are installed to have a multi-layer structure. Such a design may be a plan to minimize a parasitic capacitance value. That is, a frequency transformation by capacitance can be prevented.

A relationship of up and down positions of the connectivity antenna 1110 and the coils 1120 according to the parallel power supply scheme may be changed. That is, in the design, the coils 1120 according to the parallel power supply scheme may be located in the upper portion, and the connectivity antenna 1110 may be located in the lower portion.

Figure 12:
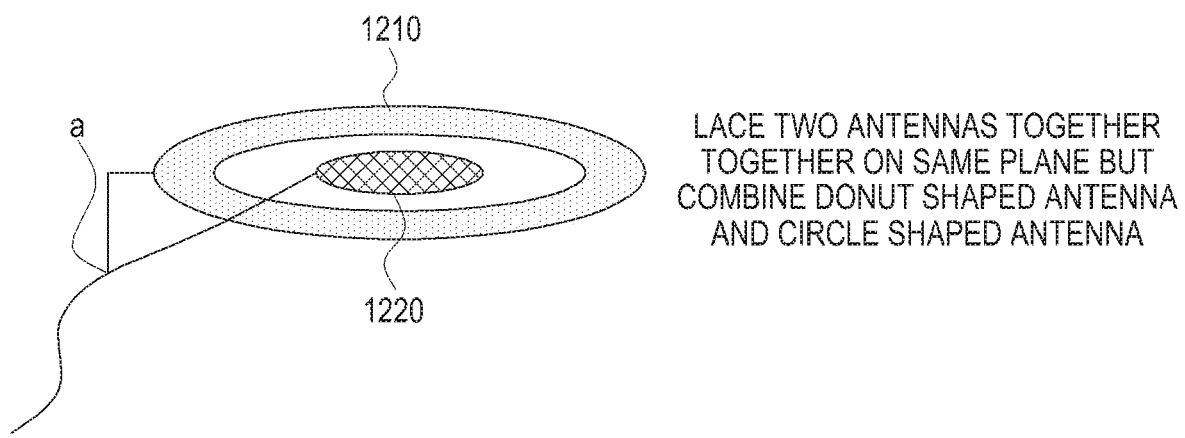
FIG. 12 illustrates another example of designing coils in consideration of visibility of a power supply device for an internal antenna included in a display according to various embodiments of the present disclosure.

FIG. 12 illustrates another example for designing coils in consideration of visibility of a power supply device for an internal antenna included in a display according to various embodiments of the present disclosure.

Referring to FIG. 12, coils 1210 and a connectivity antenna 1220 may be installed in a single-layer structure on the same plane by designing the connectivity antenna 1220 within the coils 1210 according to a parallel power supply scheme. That is, two antennas are placed together, but a combination of a donut (torus) shaped first antenna 1210 and a circle shaped second antenna 1220 can be implemented.

The first antenna 1210 and the second antenna 1220 may be disposed on the same plane. The second antenna 1220 may be substantially disposed coaxially inside a center space of the first antenna 1210. The first antenna 1210 may be an antenna for NFC, and the second antenna 1220 may be an antenna for MST. At least one of the first antenna 1210 and the second antenna 1220 may be connected to a metallic body through a second conductor.

An integrated circuit (not shown) may supply driving currents of the first antenna 1210 and the second antenna 1220. For example, an internal antenna included in the display may further include a first conductor for connecting the integrated circuit with the first and second antennas 1210 and 1220 to supply in parallel the driving currents supplied by the integrated circuit to a power supply terminal included in the first antenna 1210 and a power supply terminal included in the second antenna 1220. At least one diode may be provided on the first conductor.

Due to the driving current supplied by the integrated circuit, a phase of the current flowing in the first antenna 1210 may be the same as a phase of the current flowing in the second antenna 1220. Further, the inductor may be added to at least one of the first antenna 1210 and the second antenna 1220. An inductance of the antenna to which the inductor is added may be the same as an inductance of the other antenna.

Figure 13:
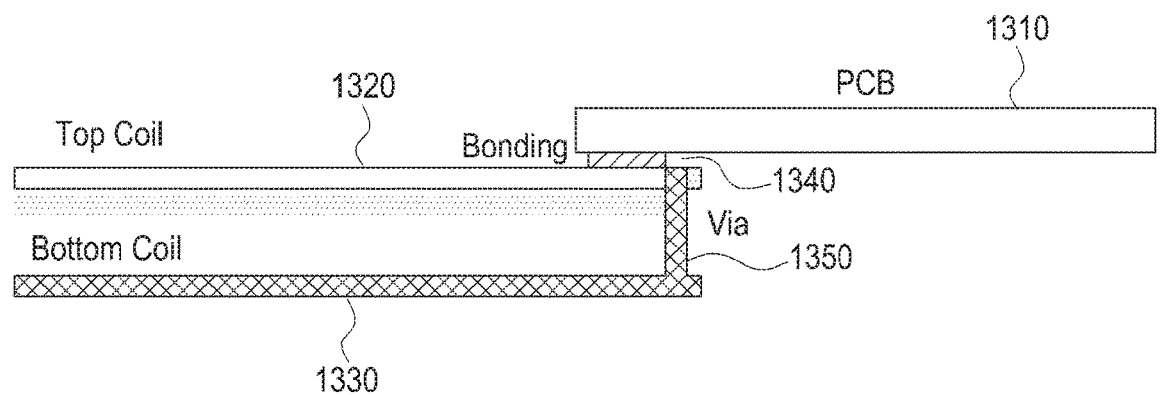
FIG. 13 illustrates an example of a one-sided assembly of a connection between coils included in a power supply device for an internal antenna included in a display and a main body according to various embodiments of the present disclosure.

FIG. 13 illustrates an example of a one-sided assembly of a connection between coils included in a power supply device for an internal antenna included in a display and a main body according to various embodiments of the present disclosure.

Referring to FIG. 13, a top coil 1320 and a bottom coil 1330 having a parallel structure are connected through a via 1350. A structure generated by connecting the top coil 1320 and the bottom coil 1330 through the via 1350 is bonded to a printed circuit board (PCB) 1310. For example, the structure and the PCB 1310 may be bonded at a part 1340 where the via 1350 for connecting the top coil 1320 and the bottom coil 1330 is located.

Figure 14:
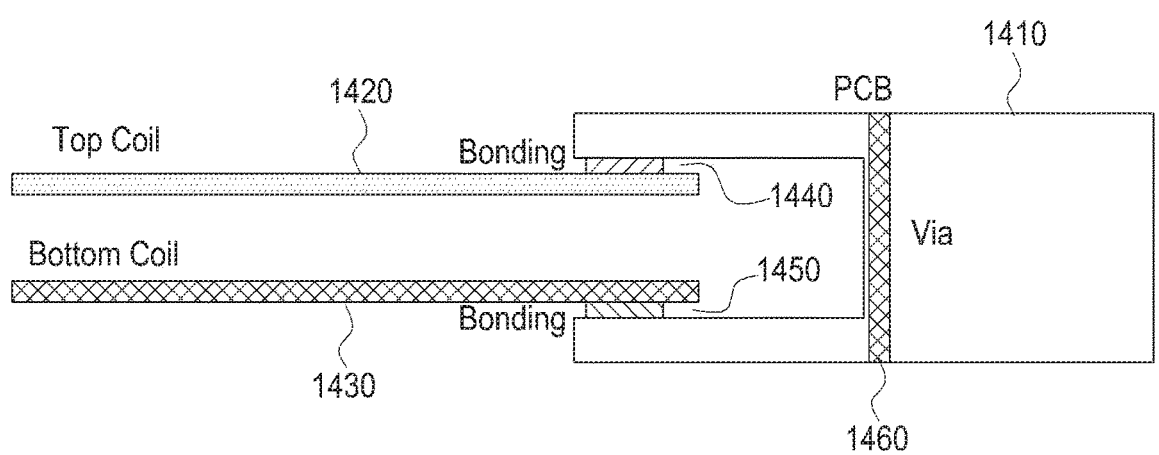
FIG. 14 illustrates an example of a two-sided assembly of a connection between coils included in a power supply device for an internal antenna included in a display and a main body according to various embodiments of the present disclosure.

FIG. 14 illustrates an example of a two-sided assembly of a connection between coils included in a power supply device for an internal antenna included in a display and a main body according to various embodiments of the present disclosure.

Referring to FIG. 14, a top coil 1420 and a bottom coil 1430 having a parallel structure are independently bonded to a PCB 1410 at parts 1440 and 1450, respectively. Further, the PCB 1410 may be penetrated by a via 1460 at a predetermined position to make the top coil 1420 and the bottom coil 1430 share a power supply terminal.

Figure 15:
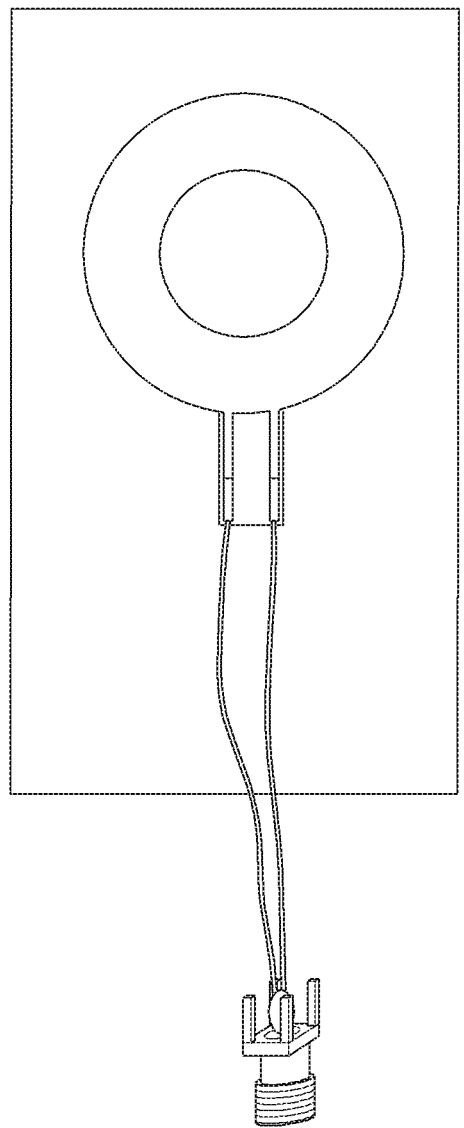
FIG. 15 illustrates an example of a power supply device for an internal antenna included in an actually manufactured display according to various embodiments of the present disclosure.

FIG. 15 illustrates an example of a power supply device for an internal antenna included in an actually manufactured display according to various embodiments of the present disclosure.

Referring to FIG. 15, it is noted that circle shaped coils have a structure capable of connecting to an external device through two power supply terminals.

While the present disclosure has been shown and described with reference to various embodiments thereof, will be understood by those skilled in the art that various changes in form and details may be made therein without departing from the spirit and scope of the present disclosure as defined by the appended claims and their equivalents.

What is claimed is:

1. A display device comprising:
   a display;
   at least two coils separated by a predetermined interval, the at least two coils being disposed at an inner side of the display; and
   an integrated circuit (IC) including a power supply terminal of the at least two coils to connect the at least two coils in parallel, the IC supplying current to the at least two coils through the included power supply terminal,
   wherein one of the at least two coils short-circuits with a metallic body.

2. The display device of claim 1, wherein an inductor is added in series to one of the at least two coils.

3. The display device of claim 2,
   wherein an inductance of the coil to which the inductor is added is identical to an inductance of the other coil.

4. The display device of claim 1, wherein the one of the at least two coils short-circuits with the metallic body in at least two predetermined points.

5. The display device of claim 1, wherein a connectivity antenna is disposed in a center area of the at least two coils and a line for connecting the connectivity antenna to a second IC for driving the connectivity antenna is drawn through an open space of the at least two coils configured to connect the power supply terminal.

6. The display device of claim 5, wherein a segment point is formed in one of the at least two coils and the line for connecting the connectivity antenna and the IC for driving the connectivity antenna is drawn through the formed segment point.

7. The display device of claim 6, wherein the segment point comprises a plurality of gaps in at least one of the at least two coils.

8. The display device of claim 6, wherein a first line for connecting the second IC is drawn through the at least two coils at the open space configured to connect the power supply terminal and a second line for connecting the second IC is drawn through the segment point.

9. The display device of claim 1,
   wherein each of the at least two coils has a substantially circular shape, and
   wherein the at least two coils are configured in a stacked configuration with a same central axis.

10. The display device of claim 9, wherein each of the at least two coils has the substantially circular shape of a same radius.

11. The display device of claim 9,
   wherein each of the at least two coils has the substantially circular shape of a different radius, and
   wherein the different radius are configured to prevent frequency transforming by mutual capacitance.

12. The display device of claim 1, wherein a diode is provided between the IC and at least one of an input power supply terminal of the at least two coils and an output power supply terminal of the at least two coils.

13. The display device of claim 1,
   wherein a first coil corresponding to one of the two coils has a torus shape, and a second coil corresponding to the other coil has a circular shape.

14. The display device of claim 13,
   wherein the second coil is disposed substantially coaxially inside a center space of the first coil on a same plane.

15. The display device of claim 1,
   wherein the at least two coils include a coil for near field communication (NFC) and a coil for magnetic secure transmission (MST).

* * * * *